US010761706B2

(12) United States Patent
Cockburn et al.

(10) Patent No.: US 10,761,706 B2
(45) Date of Patent: Sep. 1, 2020

(54) NAVIGATING AN OPERATIONAL USER INTERFACE FOR A BUILDING MANAGEMENT SYSTEM

(71) Applicant: Honeywell International Inc., Morristown, NJ (US)

(72) Inventors: Mark Cockburn, Collaroy (AU); Yi-Chang Hsieh, Cammeray (AU)

(73) Assignee: Honeywell International Inc., Morris Plains, NJ (US)

( * ) Notice: Subject to any disclaimer, the term of this patent is extended or adjusted under 35 U.S.C. 154(b) by 191 days.

(21) Appl. No.: 15/146,317

(22) Filed: May 4, 2016

(65) Prior Publication Data
US 2017/0322710 A1 Nov. 9, 2017

(51) Int. Cl.
| | | |
|---|---|---|
| G06F 3/0482 | (2013.01) | |
| G06F 3/0484 | (2013.01) | |
| G06F 3/0481 | (2013.01) | |
| G06Q 10/10 | (2012.01) | |
| G06Q 10/08 | (2012.01) | |
| G05B 15/02 | (2006.01) | |
| G06Q 50/16 | (2012.01) | |

(52) U.S. Cl.
CPC ......... G06F 3/04847 (2013.01); G05B 15/02 (2013.01); G06F 3/04817 (2013.01); G06F 3/04842 (2013.01); G06Q 10/087 (2013.01); G06Q 10/101 (2013.01); G06Q 50/16 (2013.01); *G05B 2219/2642* (2013.01)

(58) Field of Classification Search
CPC ............. G06F 3/04847; G06F 3/04817; G06F 3/04842
See application file for complete search history.

(56) References Cited

U.S. PATENT DOCUMENTS

| | | | | |
|---|---|---|---|---|
| 6,067,477 | A * | 5/2000 | Wewalaarachchi .. | G05B 19/418 700/17 |
| 7,567,844 | B2 * | 7/2009 | Thomas ................. | G05B 15/02 348/143 |
| 7,587,274 | B2 * | 9/2009 | Kaldewey .............. | G01C 21/00 340/995.1 |

(Continued)

OTHER PUBLICATIONS

"Synergy™ Security Management System", http://www.synecticsusa.com/images/pdfs/data-sheets/2013/synectics_synergy_brochure.pdf, 2013, 12 pp.

(Continued)

*Primary Examiner* — Phenuel S Salomon
(74) *Attorney, Agent, or Firm* — Seager, Tufte & Wickhem, LLP (57) ABSTRACT

Devices, methods, and systems for navigating an operational user interface for a building management system are described herein. One device includes a user interface, a memory, and a processor configured to execute executable instructions stored in the memory to display, on the user interface of the computing device, an operational user interface for a building management system, wherein the operational user interface includes a number of orthogonal navigation models for the building management system within a single navigation structure, and navigate between the number of orthogonal navigation models within the single navigation structure in the operational user interface.

10 Claims, 7 Drawing Sheets

(56) References Cited

U.S. PATENT DOCUMENTS

| Patent/Publication No. | | Date | Inventor | Classification |
|---|---|---|---|---|
| 7,899,777 | B2* | 3/2011 | Baier | G06Q 10/06 706/60 |
| 7,954,070 | B2* | 5/2011 | Plocher | G08B 25/14 700/13 |
| 8,270,767 | B2* | 9/2012 | Park | G08B 13/19641 345/420 |
| 8,270,769 | B2* | 9/2012 | Judelson | G06T 19/00 345/619 |
| 9,047,753 | B2 | 6/2015 | Dawes et al. | |
| 2001/0030667 | A1* | 10/2001 | Kelts | G06F 3/0481 715/854 |
| 2002/0138289 | A1* | 9/2002 | Thielges | G06Q 10/06 705/314 |
| 2003/0234725 | A1* | 12/2003 | Lemelson | G08B 7/066 340/521 |
| 2005/0015222 | A1* | 1/2005 | Harrington | G06Q 10/06 703/1 |
| 2005/0209770 | A1* | 9/2005 | O'Neill | G01C 21/3407 701/117 |
| 2006/0031455 | A1* | 2/2006 | Charron | G06Q 10/10 709/223 |
| 2006/0085367 | A1* | 4/2006 | Genovese | G06Q 10/00 706/44 |
| 2006/0211404 | A1* | 9/2006 | Cromp | G06Q 10/06 455/405 |
| 2007/0103292 | A1* | 5/2007 | Burkley | G07C 9/00111 340/539.13 |
| 2007/0219645 | A1* | 9/2007 | Thomas | G05B 15/02 700/29 |
| 2007/0219843 | A1* | 9/2007 | Keeler | G06Q 10/0631 705/7.13 |
| 2008/0040191 | A1* | 2/2008 | Chakravarty | G06Q 10/06 705/7.15 |
| 2008/0058970 | A1* | 3/2008 | Perumalsamy | G06Q 10/06 700/90 |
| 2009/0262206 | A1* | 10/2009 | Park | G08B 13/19641 348/218.1 |
| 2010/0058248 | A1* | 3/2010 | Park | G06Q 10/06 715/851 |
| 2011/0029241 | A1* | 2/2011 | Miller | G01C 21/16 701/500 |
| 2011/0029897 | A1* | 2/2011 | Russell | G05B 15/02 715/757 |
| 2011/0087988 | A1* | 4/2011 | Ray | G06Q 10/06 715/771 |
| 2011/0112875 | A1* | 5/2011 | Johnson | G06Q 10/063 705/7.11 |
| 2011/0113120 | A1* | 5/2011 | Johnson | G05B 15/02 709/218 |
| 2011/0214050 | A1* | 9/2011 | Stambaugh | G06F 3/04817 715/234 |
| 2012/0017168 | A1* | 1/2012 | Mason | G06F 3/04817 715/781 |
| 2012/0059818 | A1* | 3/2012 | Phang | G06F 16/29 707/722 |
| 2012/0131217 | A1* | 5/2012 | Delorme | G06Q 10/06 709/230 |
| 2012/0159389 | A1* | 6/2012 | Keith | G06Q 10/00 715/810 |
| 2012/0192076 | A1 | 7/2012 | Rocca | |
| 2012/0259583 | A1* | 10/2012 | Noboa | G05B 15/02 702/179 |
| 2013/0293718 | A1 | 11/2013 | M et al. | |
| 2014/0089035 | A1* | 3/2014 | Jericho | G07C 5/008 705/7.26 |
| 2014/0240356 | A1 | 8/2014 | Cupitt et al. | |
| 2014/0245232 | A1* | 8/2014 | Bailiang | G06F 3/04815 715/850 |
| 2014/0258940 | A1* | 9/2014 | Han | G06F 3/0484 715/854 |
| 2014/0365891 | A1 | 12/2014 | Morrison et al. | |
| 2014/0365942 | A1 | 12/2014 | Morrison et al. | |
| 2014/0376410 | A1* | 12/2014 | Ros | H04M 11/04 370/259 |
| 2015/0142508 | A1* | 5/2015 | Buck | G06Q 10/0635 705/7.28 |
| 2015/0169190 | A1* | 6/2015 | Girardeau | G06F 3/04842 715/771 |
| 2015/0327010 | A1* | 11/2015 | Gottschalk | G06F 17/50 455/456.1 |
| 2016/0335731 | A1* | 11/2016 | Hall | G06Q 50/163 |
| 2017/0230808 | A1* | 8/2017 | Ros | H04W 4/90 |
| 2017/0256151 | A1* | 9/2017 | Berlic | H04N 7/18 |
| 2017/0316354 | A1* | 11/2017 | Rahul U | G06Q 10/0633 |
| 2018/0096153 | A1* | 4/2018 | DeWitte | G06F 21/577 |

OTHER PUBLICATIONS

"Perimeter Security Manager", http://www.southwestmicrowave.com/pdfs/Perimeter-Security-Manager-Data-Sheet-EN.pdf, Nov. 2015, 4 pp.

"Command Wall", https://www.honeywellprocess.com/library/marketing/brochures/honeywell-command-wall-brochure.pdf, Jun. 2015, 4 pp.

* cited by examiner

NAVIGATING AN OPERATIONAL USER INTERFACE FOR A BUILDING MANAGEMENT SYSTEM

TECHNICAL FIELD

The present disclosure relates to devices, methods, and systems for navigating an operational user interface for a building management system.

BACKGROUND

Building information modeling (BIM) can refer to the generation and/or management of data associated with a facility (e.g., building), including, for instance, data associated with the components, equipment, and/or properties of the facility. For example, BIM data can include architectural, mechanical, electrical, plumbing, sanitary, fire, and/or geometrical information associated with a facility.

BIM data associated with a facility can be used to generate an operational user interface for a building management system for the facility, which can be displayed to a user (e.g., operator) and used by the user to monitor and/or control the facility. For example, the user (e.g., operator) of a building management system can check and/or set the state of control components, equipment, devices, networks, areas, and/or spaces of the facility using the operational user interface for the building management system. The operational user interface can include, for example, the floor plan of the facility, with additional information about the facility, such as, for instance, information about a device(s) of the building, information about a control network(s) of the building, schematic graphics of the building, etc., overlaid on the floor plan.

The amount of BIM data and/or information associated with a facility, however, can be very large, especially if the facility has a large size and/or a large number of systems that need to be managed. Accordingly, a building management system may utilize a large amount of BIM data, which can make previous operational user interfaces for building management systems difficult for the operator to navigate, particularly during times of crisis when the operator has to respond quickly. For example, the large amount of data may make it difficult for the operator to seamlessly move between different types of content within previous operational user interfaces, such as, for instance, between related and non-related content, thereby increasing the amount of time it may take for the operator to navigate through the operational user interface in order to find what he or she is looking for, or even preventing the operator from finding it altogether. As such, the operator may not be able to obtain all the information he or she may need to make informed decisions when managing the facility, particularly during times of crisis when the operator has to respond quickly.

DETAILED DESCRIPTION

Devices, methods, and systems for navigating an operational user interface for a building management system are described herein. For example, one or more embodiments include a user interface, a memory, and a processor configured to execute executable instructions stored in the memory to display, on the user interface of the computing device, an operational user interface for a building management system, wherein the operational user interface includes a number of orthogonal navigation models for the building management system within a single navigation structure, and navigate between the number of orthogonal navigation models within the single navigation structure in the operational user interface.

Navigating operational user interfaces for building management systems in accordance with embodiments of the present disclosure can be easier than navigating previous operational user interfaces, particularly during times of crisis when an operator has to respond quickly. For example, it may be easier for the operator to seamlessly move between different types of content, such as, for instance, between related and non-related content, while navigating operational user interfaces in accordance with embodiments of the present disclosure, thereby decreasing the amount of time it may take for the operator to navigate through the operational user interface in order to find what he or she is looking for as compared with previous operational user interfaces. As such, the operator can quickly and efficiently navigate operational user interfaces for building management systems in accordance with the present disclosure to obtain all the information he or she may need to make informed decisions when managing a facility, particularly during times of crisis when the operator has to respond quickly.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of models" can refer to one or more models.

Figure 1:
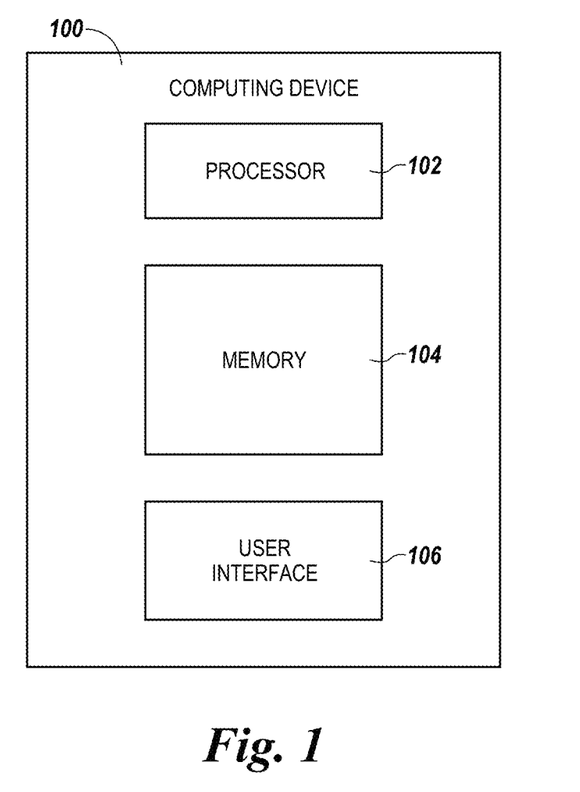
FIG. 1 illustrates a computing device for navigating an operational user interface for a building management system in accordance with one or more embodiments of the present disclosure.

FIG. 1 illustrates a computing device 100 for navigating an operational user interface for a building management system in accordance with one or more embodiments of the present disclosure. Computing device 100 can be, for example, a laptop computer, desktop computer, or mobile device (e.g., smart phone, tablet, PDA, etc.), among other types of computing devices. However, embodiments of the present disclosure are not limited to a particular type of computing device.

As shown in FIG. 1, computing device 100 can include a memory 104 and a processor 102. Memory 104 can be any type of storage medium that can be accessed by processor 102 to perform various examples of the present disclosure. For example, memory 104 can be a non-transitory computer readable medium having computer readable instructions (e.g., computer program instructions) stored thereon that are executable by processor 102 to navigate an operational user interface for a building management system in accordance with the present disclosure. That is, processor 102 can execute the executable instructions stored in memory 104 to navigate an operational user interface for a building management system in accordance with the present disclosure.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 104 is illustrated as being located in computing device 100, embodiments of the present disclosure are not so limited. For example, memory 104 can also be located internal to another computing resource (e.g., enabling computer readable instructions to be downloaded over the Internet or another wired or wireless connection).

As shown in FIG. 1, computing device 100 can include a user interface 106. A user (e.g., operator) of computing device 100, such as, for instance, an operator or manager of a building management system, can interact with computing device 100 via user interface 106. For example, user interface 106 can provide (e.g., display and/or present) information to the user of computing device 100, such as, for instance, an operational user interface for the building management system, as will be further described herein. Further, user interface 106 can receive information from (e.g., input by) the user of computing device 100, such as, for instance, selections made during navigation of the operational user interface for the building management system, as will be further described herein.

In some embodiments, user interface 106 can be a graphical user interface (GUI) that can include a display (e.g., a screen) that can provide and/or receive information to and/or from the user of computing device 100. The display can be, for instance, a touch-screen (e.g., the GUI can include touch-screen capabilities). As an additional example, user interface 106 can include a keyboard and/or mouse the user can use to input information into computing device 100. Embodiments of the present disclosure, however, are not limited to a particular type(s) of user interface.

As an example, in some embodiments, computing device 100 can generate an operational (e.g., graphical) user interface for a building management system, and the operational user interface can be displayed (e.g., to a user, such as, for instance, an operator or manager of the building management system) on user interface 106. As used herein, a "building management system" can refer to any type of system that can be used to monitor and/or control a facility or building. For example, a building management system can be used to check and/or set the state of control components, equipment, devices, networks, areas, and/or spaces of the facility or building. As an additional example, a building management system can be used to manage alarms and/or incidents, such as, for instance, security incidents, that may occur at the facility or building.

The operational user interface generated by computing device 100 can include a number of orthogonal navigation models for the building management system within a single navigation structure. The number of orthogonal navigation models can include, for example, a facility navigation model for the building management system (e.g. a model that can be used by the user to navigate through a facility or building of the building management system), an incident navigation model for the building management system (e.g., a model that can be used by the user to navigate through incidents occurring at the facility or building), and an alarm navigation model for the building management system (e.g., a model that can be used by the user to navigate through alarms occurring at the facility or building), among other types of navigation models. As such, the operational user interface can include, for instance, a facility navigation model, an incident navigation model, and an alarm navigation model within a single navigation structure.

Each orthogonal navigation model can include information that can be displayed within the single navigation structure in the operational user interface, as will be further described herein. For instance, the information in the facility navigation model can include floor plans of the levels (e.g., floors) of the facility or building of the building management system. The floor plans can include, for instance, a number of selectable icons, each representing a different security camera on that level. The information in the incident navigation model can include, for instance, information about incidents occurring at the facility or building of the building management system, such as, for instance, a workflow (e.g., steps) for managing each respective incident, information about activities occurring during each respective incident, and/or information about steps that have been taken to manage and/or control the incident. The information in the alarm navigation model can include, for instance, information about alarms occurring at the facility or building of the building management system.

As used herein, an incident can refer to an event that is occurring at a facility or building of the building management system, while an alarm can refer to (e.g., provide) an indication that the event is occurring. For example, a fire occurring at a facility or building can be an event, which can be indicated by fire alarms of the facility or building being activated. As an additional example, a security breach of a particular space or area of a facility or building of the building management system can be an event, which can be indicated by security alarms of that space or area being activated.

The operational user interface can be generated, for example, using ontology data associated with the building management system. The ontology data associated with the building management system can be and/or include, for instance, meta-data such as a naming convention of, attributes of, and/or relationships between the components, equipment, devices, networks, areas, and/or spaces of the facilities and/or buildings of the building management system. For example, the ontology data can define the name of a class or concept in the building management system, the properties and/or attributes of the class, and or its relationship with other classes in the building management system. The relationship may also have properties and/or attributes.

The ontology data associated with the building management system can be generated, for example, using building information modeling (BIM) data associated with the building management system. The BIM data associated with the building management system can include data associated with the components (e.g., control components), equipment, devices, networks (e.g., control networks), areas, spaces, and/or properties of the facilities and/or buildings of the building management system. For example, the BIM data can include architectural (e.g., floor plan), mechanical, electrical, plumbing, sanitary, fire, and/or geometrical information associated with the facilities and/or buildings of the building management system.

In some embodiments, the BIM data associated with the building management system can be stored in a BIM database that is located remotely from computing device 100 (e.g., in the cloud). In such embodiments, computing device 100 can receive the BIM data from the database via a network (not shown in FIG. 1). The network can be, for example, a wide area network (WAN) such as the Internet, a local area network (LAN), a personal area network (PAN), a campus area network (CAN), or metropolitan area network (MAN), among other types of networks.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Because the operational user interface displayed by computing device 100 can include a number of orthogonal navigation models for the building management system within a single navigation structure, the user (e.g., the operator or manager of the building management system) can navigate (e.g., move) between the orthogonal navigation models within the single navigation structure in the operational user interface on the display. Because the user can navigate between the orthogonal navigation models within the single navigation structure, it may be easier for the user to navigate the operational interface than previous building management system operational user interfaces, as previously described herein.

For example, the operational user interface may display, within the single navigation structure, information from a first one of the number of orthogonal navigation models, and then may subsequently display information from a second (e.g., additional) one of the number of orthogonal navigation models. The information may be displayed, for instance, responsive to sequential selections of each respective navigation model being received from (e.g., made by) the user in the operational user interface. For instance, the information from the first model may be displayed responsive to an initial selection of the first model, and the information from the second model may then be displayed responsive to a subsequent selection of the second model.

The selections may be received from the user via user interface 106 of computing device 100. For example, the operational user interface may include a toolbar with icons representing each respective one of the number of orthogonal navigation models, and information from each respective model may be displayed within the single operational structure responsive to the user selecting that model's icon from the toolbar.

In some embodiments, the information from the first navigation model being displayed within the single navigation structure of the operational user interface may continue to be displayed along with the information from the second navigation model. For instance, the operational user interface may add (e.g., overlay or embed) the information from the second navigation model to the information displayed from the first navigation model responsive to the selection of the second model.

In some embodiments, the information from the first navigation model being displayed within the single navigation structure of the operational user interface may be replaced in the display by the information from the second navigation model in the operational user interface. For instance, the information from the first navigation model may be removed from the operational user interface display responsive to the selection of the second navigation model.

Continuing in the navigation example, the operational user interface may then subsequently display, within the single navigation structure, information from a third one of the number of orthogonal navigation models. The information from the third navigation model may be displayed, for example, responsive to a subsequent selection of that model being received from (e.g., made by) the user in the operational user interface, in a manner analogous to the selections of the first and second navigation models. The information from the first and/or second navigation models being displayed within the single navigation structure of the operational user interface may continue to be displayed along with the information from the third navigation model, or may be replaced in the display by the information from the third navigation model. The user may continue to navigate between the orthogonal navigation models within the single navigation structure in the operational user interface in an analogous manner.

In the navigation example described above, the first navigation model can be a facility navigation model, the second navigation model can be an incident navigation model, and the third navigation model can be an alarm navigation model. In such an example, the information from the facility navigation model may continue to be displayed within the single navigation structure of the operational user interface along with the information from the incident navigation model, and the subsequent information from the alarm navigation model may then replace the information from the incident navigation model such that the information from the alarm navigation model is displayed within the single navigation structure of the operational user interface along with the information from the facility navigation model. Such a navigation example will be further described herein (e.g., in connection with FIGS. 2A-2E). However, embodiments of the present disclosure are not limited to this particular navigation example.

FIGS. 2A-2E illustrate an example of navigating an operational user interface for a building management system in accordance with one or more embodiments of the present disclosure. For example, FIGS. 2A-2E illustrate sequential screen shots 210, 212, 214, 216, and 218 displayed during the navigation of the operational user interface by a user, such as an operator or manager of the building management system. The screen shots may be displayed, for example, on user interface 106 of computing device 100 previously described in connection with FIG. 1.

Figure 2A:
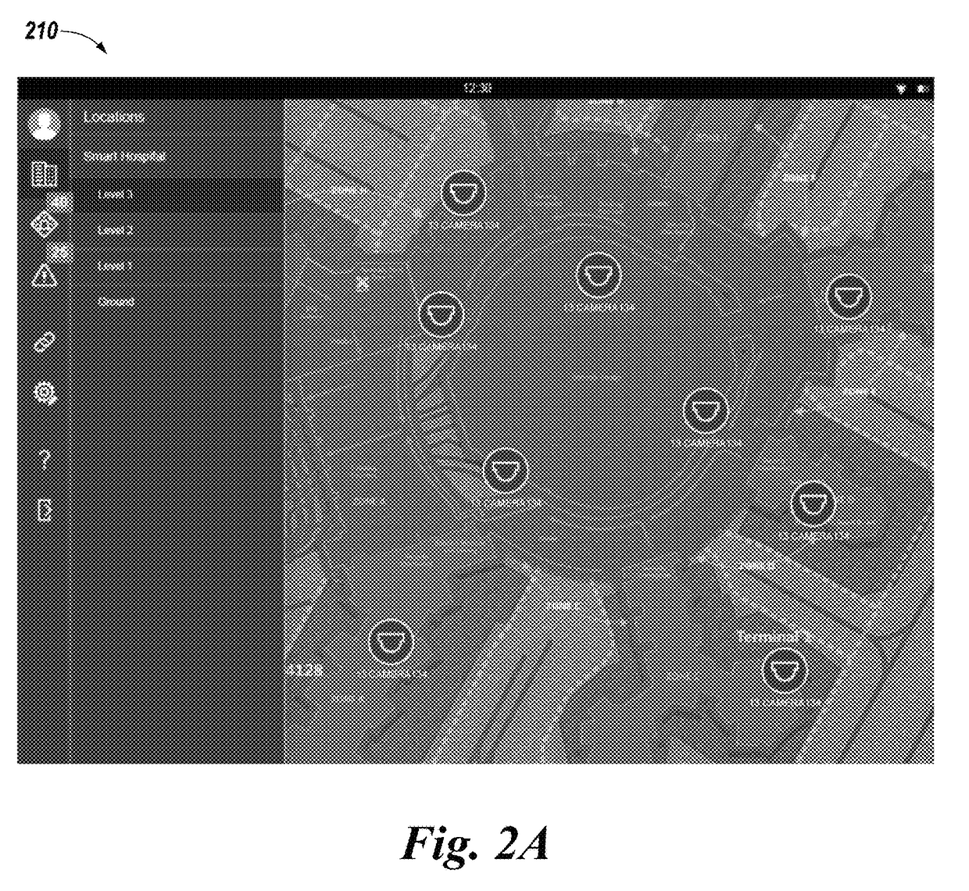
FIGS. 2A-2E illustrate an example of navigating an operational user interface for a building management system in accordance with one or more embodiments of the present disclosure.

In screen shot 210 illustrated in FIG. 2A, the operational user interface is displaying information from a facility navigation model for the building management system. As shown in FIG. 2A, the information displayed includes a floor plan (e.g., map) of a level (e.g., level 3) of a facility (e.g., a hospital) of the building management system, which illustrates the different zones of the level. As shown in FIG. 2A, the floor plan also includes a number of selectable icons, each representing a different security camera located on the level.

As shown in FIG. 2A, the operational user interface may include (e.g., on the left side) a toolbar with a number selectable of icons, each representing a different orthogonal navigation model included in the single navigation structure of the operational user interface. For instance, as shown in FIG. 2A, the toolbar includes an icon (e.g., the building icon) representing the facility navigation model for the building management system, an icon (e.g., the diamond-shaped icon) representing an incident navigation model for the building management system, and an icon (e.g., the triangle-shaped icon) representing an alarm navigation model for the building management system. The icons representing the incident navigation model and the alarm navigation model may also display the current number of incidents and alarms, respectively, occurring in the building management system, as illustrated in FIG. 2A. The toolbar may also include icons representing the current user logged in to the operational user interface (e.g., the icon with the outline of the person), workspace links within the operational user interface (e.g., the interlocking links icon), a mode edit toggle for the operational user interface (e.g., the gear icon), a help link for the operational user interface (e.g., the question-mark icon), and a log out link to log out of the operational user interface (e.g., the door icon).

In screen shot 210 illustrated in FIG. 2A, the user has selected the icon in the toolbar of the operational user interface representing the facility navigation model. Responsive to that selection, a navigation panel that lists the different levels (e.g., level 3, level 2, level 1, and ground) of the facility has been displayed in a navigation panel in the operational user interface, as illustrated in FIG. 2A. From the navigation panel, the user has selected level 3, and responsive to that selection the floor plan for level 3 from the facility navigation model is displayed in the operational user interface, as illustrated in FIG. 2A.

Figure 2B:
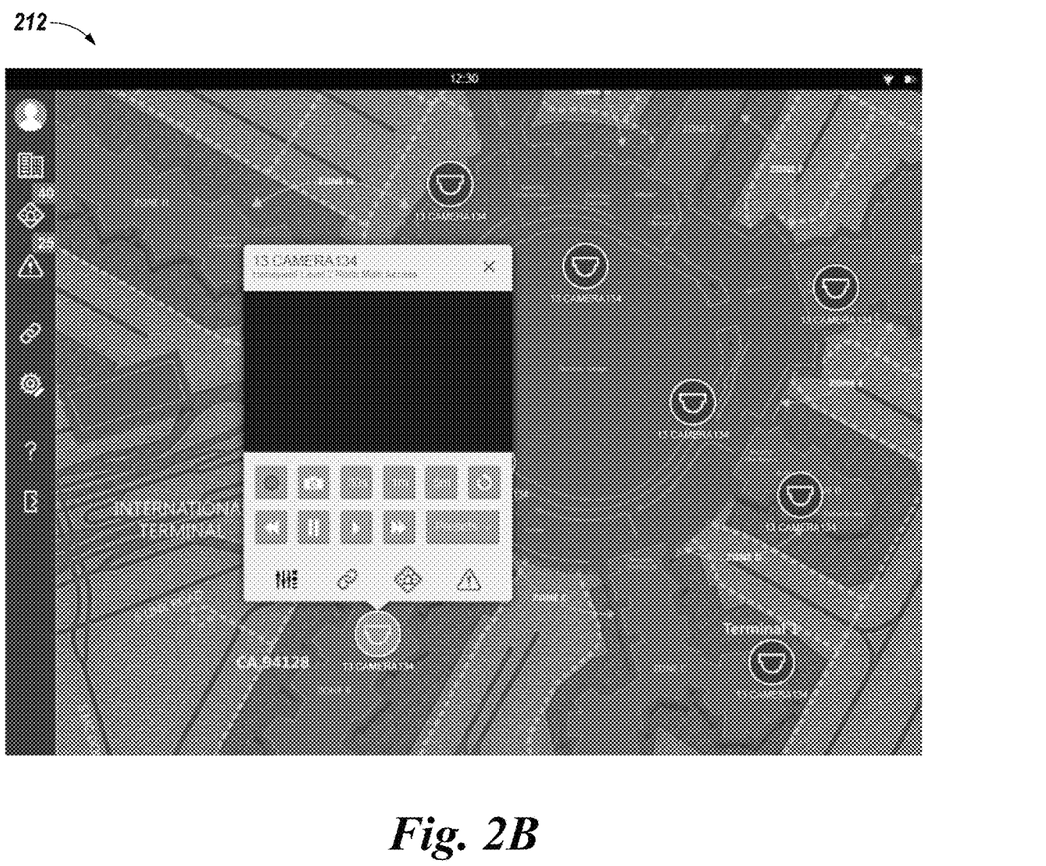

In screen shot 212 illustrated in FIG. 2B, the user has selected an icon representing one of the security cameras located on level 3. Responsive to this selection, a window that includes a view of the images (e.g., video) from (e.g., captured and/or being captured by) the camera, and controls for viewing the images (e.g., play, pause, etc.), have been displayed in the operational user interface, as illustrated in FIG. 2B. In some embodiments (e.g., embodiments in which user interface 106 of computing device 100 includes touch screen capabilities), the images from the camera can be expanded to full screen in the operational user interface responsive to the user performing a two finger pinch outward on the images. The full screen image can then be retracted back to the window responsive to the user tapping an exit button displayed in the full screen image.

Figure 2C:
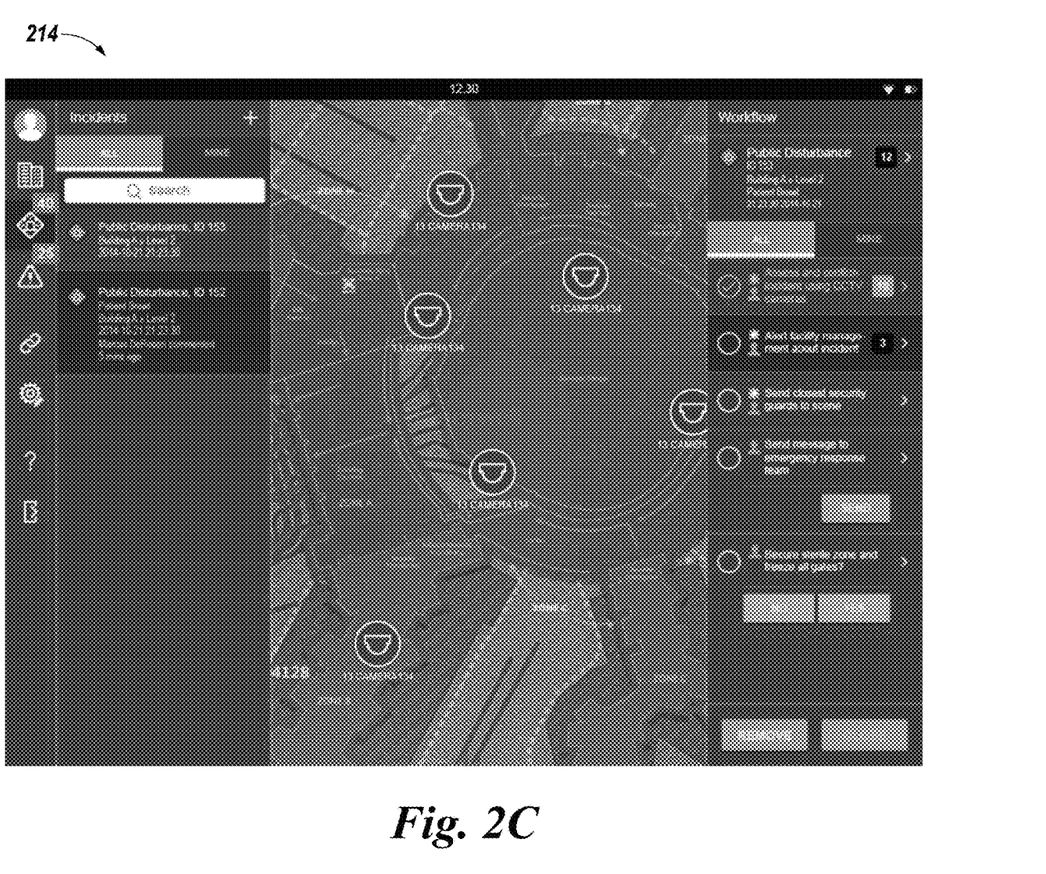

In screen shot 214 illustrated in FIG. 2C, the operational user interface is displaying information from an incident navigation model for the building management system. In the example illustrated in FIG. 2C, the information displayed includes a workflow (e.g., steps) for managing a selected incident occurring at the facility (e.g., on the level of the facility currently being displayed within the operational user interface).

For instance, in the example illustrated in FIG. 2C, the user has selected the icon in the toolbar of the operational user interface representing the incident navigation model. Responsive to that selection, an incident panel (e.g., tab) is displayed within the operational user interface that lists the incidents (e.g., Public Disturbance ID 153 and Public Disturbance ID 152) occurring on the currently displayed facility level, as illustrated in FIG. 2C. From the incident panel, the user has selected (e.g., tapped) Public Disturbance ID 152 (Patient Brawl), and responsive to that selection the workflow for managing that incident (e.g., assess and confirm incident, alert facility management, send closest security guards, send message to emergency response team, and secure sterile zones) from the facility navigation model is displayed in the operational user interface, as illustrated in FIG. 2C.

As shown in FIG. 2C, the workflow can be displayed within the operational user interface while the information from the facility navigation model (e.g., the floor plan) continues to be displayed within the operational user interface. For instance, the display of the floor plan in the operational user interface can move to the location of the incident, and the workflow can be displayed in a detailed information panel added over the right side of the floor plan within the operational user interface, as illustrated in FIG. 2C.

Figure 2D:
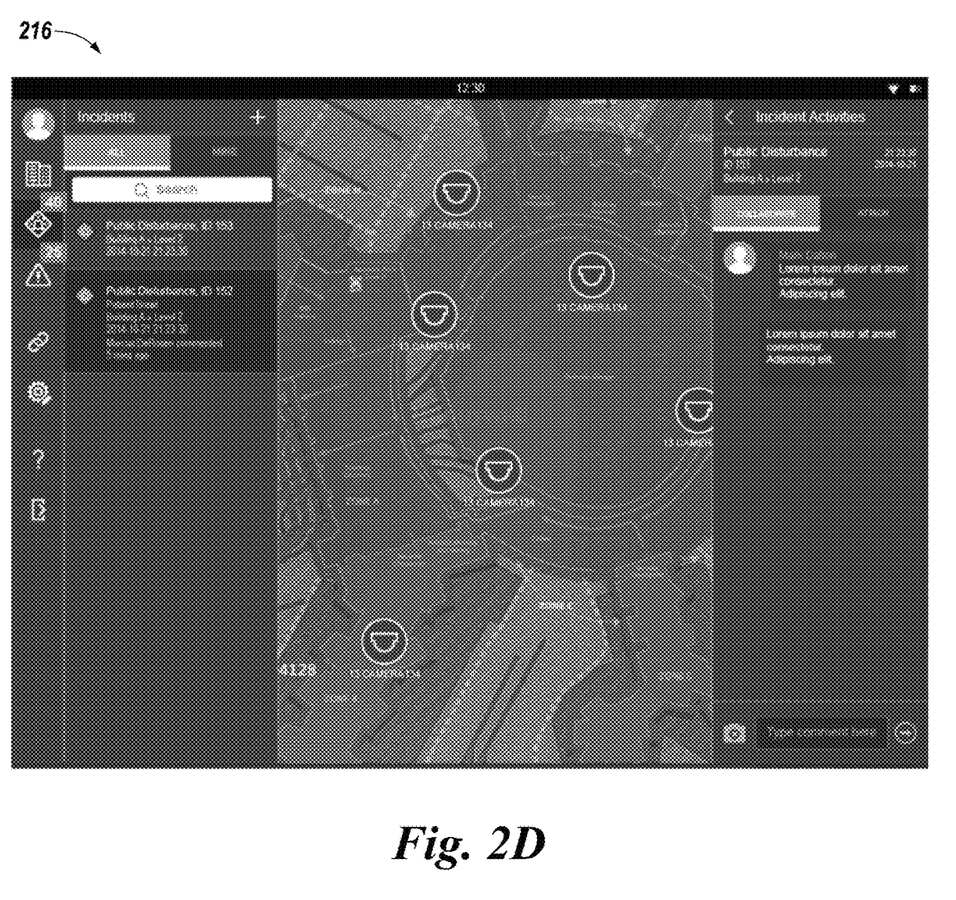

In screen shot 216 illustrated in FIG. 2D, the operational user interface is displaying additional information about the selected incident from the incident navigation model for the building management system. In the example illustrated in FIG. 2D, the information displayed includes information about activities occurring during the selected incident. For instance, the user can record (e.g. log) information about activities occurring during the incident, and chat with other users (e.g., other operators and/or managers) about the incident, as illustrated in FIG. 2D.

As shown in FIG. 2D, the activity information can be displayed within the operational user interface while the information from the facility navigation model (e.g., the floor plan) continues to be displayed within the operational user interface. For instance, the activity information can replace the workflow previously displayed in the detailed information panel on the right side of the operational user interface (e.g., rather than adding an additional information panel displaying the activity information to the operational user interface), as illustrated in FIG. 2D, so that the floor plan is not covered with multiple detailed information panels (e.g., multiple pop-ups).

Figure 2E:
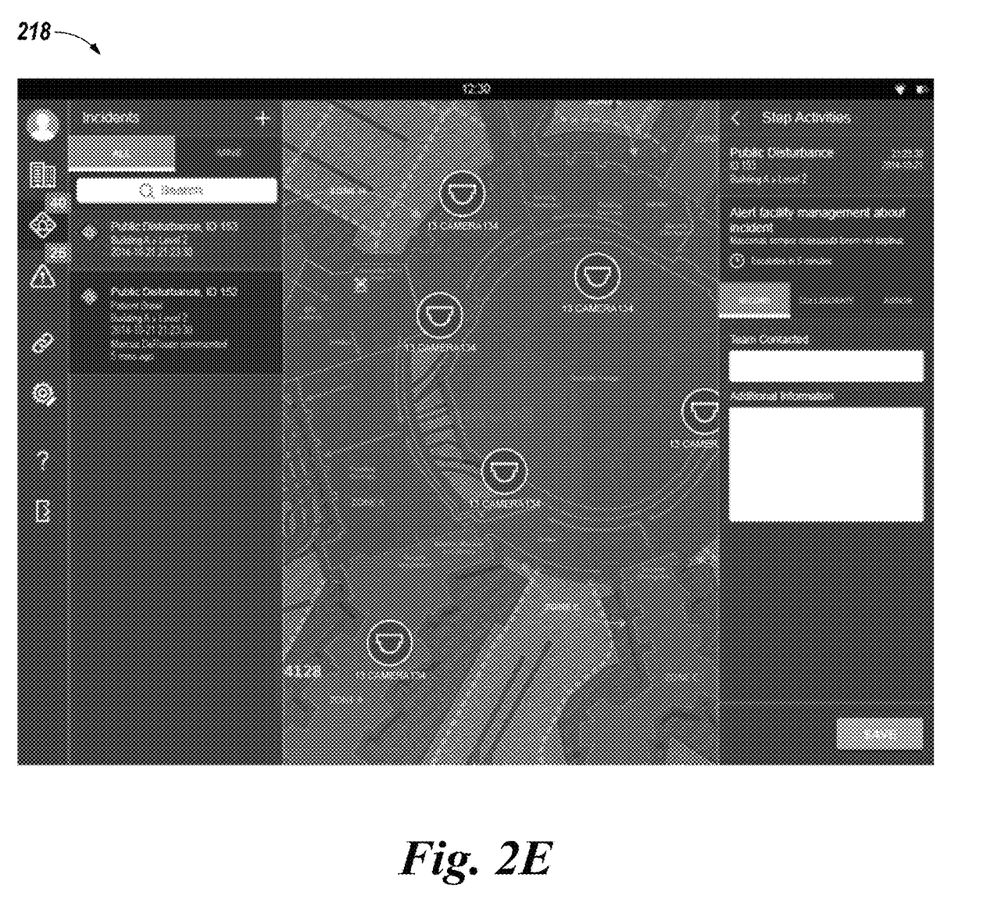

In screen shot 218 illustrated in FIG. 2E, the operational user interface is displaying additional information about the selected incident from the incident navigation model for the building management system. In the example illustrated in FIG. 2E, the information displayed includes information about steps being taken to manage the selected incident. For instance, the user can record the steps he or she has taken to manage the incident, including who has been contacted about the incident and additional information, as illustrated in FIG. 2E. Further, although not shown in FIG. 2E, the user may also collaborate with other users (e.g., other operators and/or managers) about the steps being taken to manage the incident and/or assign steps to other users to take to manage the incident in the display.

As shown in FIG. 2E, the information about the steps can be displayed within the operational user interface while the information from the facility navigation model (e.g., the floor plan) continues to be displayed within the operational user interface. For instance, the information about the steps can replace the activity information previously displayed in the detailed information panel on the right side of the operational user interface (e.g., rather than adding an additional information panel displaying the information about the steps to the operational user interface), as illustrated in FIG. 2E, so that the floor plan is not covered with multiple detailed information panels (e.g., multiple pop-ups).

Figure 3:
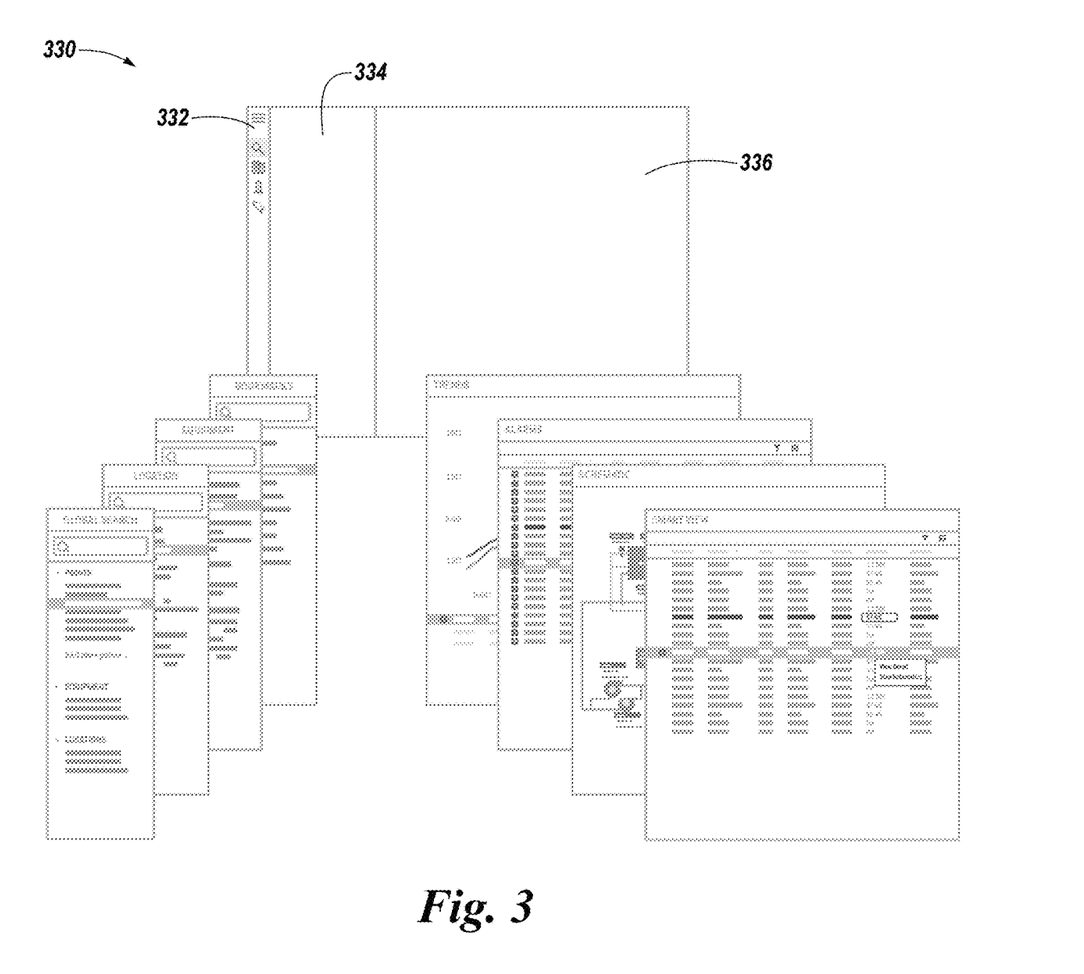
FIG. 3 illustrates an example of navigating an operational user interface for a building management system in accordance with one or more embodiments of the present disclosure.

FIG. 3 illustrates an example of navigating an operational user interface for a building management system in accordance with one or more embodiments of the present disclosure. For example, FIG. 3 illustrates a compilation 330 of various screen shots that can be displayed during the navigation of the operational user interface by a user, such as an operator or manager of the building management system. The screen shots may be displayed, for example, on user interface 106 of computing device 100 previously described in connection with FIG. 1.

As shown in FIG. 3, the operational user interface may include (e.g., on the left side) a toolbar 332 with a number selectable of icons (e.g., buttons), each representing a different orthogonal navigation model included in the single navigation structure of the operational user interface, in a manner analogous to the toolbar previously described in connection with FIGS. 2A-2E. For instance, the user can switch between the different orthogonal navigation models by selecting the different icons in toolbar 332.

As shown in FIG. 3, the operational user interface may include a navigation panel 334 adjacent toolbar 332. Navigation panel 334 can include (e.g., display) different orthogonal navigation panels corresponding to the different orthogonal navigation models included in the single navigation structure of the operational user interface. For instance, the navigation panel displayed in navigation panel 334 can correspond to (e.g., change responsive to) the selection made by the user in toolbar 332.

Compilation 330 shown in FIG. 3 illustrates examples of different orthogonal navigation panels that can be displayed in navigation panel 334. For instance, as shown in FIG. 3, the navigation panels can include a search (e.g., global search) navigation panel, a facility (e.g., location) navigation panel, an equipment navigation panel, and/or a bookmark navigation panel. However, embodiments of the present disclosure are not limited to these examples. For instance, the navigation panels may also include an alarm navigation panel and/or an incident navigation panel, among others. Each respective navigation panel can be displayed in navigation panel 334 responsive to a selection of its corresponding navigation model in toolbar 332 (e.g., the search navigation panel can be displayed responsive to a selection of the search icon, the location navigation panel can be displayed responsive to a selection of the location icon, etc.).

As shown in FIG. 3, the operational user interface may include a view panel 336 adjacent navigation panel 334. View panel 336 can include (e.g., display) information (e.g., data) from the different orthogonal navigation models included in the single navigational structure of the operational user interface. The data may be displayed in different visualizations and/or representations, depending on which navigation model the data is from.

Compilation 330 shown in FIG. 3 illustrates examples of different visualizations and representations of information that can be displayed in view panel 336. For instance, as shown in FIG. 3, the information from the navigation models can include and/or be displayed as a grid table (e.g., smart view), a schematic, alarms, and/or trends. However, embodiments of the present disclosure are not limited to these examples. For instance, the information may also include and/or be displayed as a map, among other types of examples.

As such, the user can navigate the operational user interface to look at the building management system via different views, such as, for instance, a grid table (e.g., smart view) showing data points, a schematic showing equipment supply and demand relationships, an alarm detail page showing issues in the system, etc. These views can be changed, filtered, and/or navigated via different navigation mechanisms, such as, for instance, a location model tree, equipment tree model, alarm list, incident list, etc. Some navigation mechanisms, such as, for instance, global search and/or bookmarks, can allow the user to filter down to a specific set of items better and/or faster.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for navigating an operational user interface for a building management system that is configured to be used to control and/or manage a building, the computing device comprising:
a user interface;
a memory; and
a processor configured to execute executable instructions stored in the memory to:
display, on the user interface of the computing device, an operational user interface for a building management system used to manage an alarm or incident occurring at a building, wherein the operational user interface includes a number of orthogonal navigation models for the building management system within a single navigation structure that can be used to resolve the alarm or incident occurring at the building, and each of the orthogonal navigation models relate to different features of the building management system, the number of orthogonal navigation models include:
- a building navigation model for the building management system including a floor plan of at least part of the building; and
- an incident navigation model for the building management system including information regarding each of one or more incidents and a workflow that includes a plurality of steps for resolving the corresponding incident, and wherein the building management system identifies a location for each of at least some of the one or more incidents on the floor plan;

navigate between the number of orthogonal navigation models within the single navigation structure in the operational user interface in accordance with selections received via the user interface to move between different types of content associated with the building within the single navigational structure in the operational user interface;

display, within the single navigation structure in the operational user interface, information from the building navigation model including at least part of the floorplan and, responsive to a selection of one of the one or more incidents, concurrently display information from the incident navigation model regarding the selected incident including the corresponding workflow for resolving the selected incident, where the display of the floor plan in the operational user interface moves to display the location in the floor plan that corresponds to the selected incident; and take the plurality of steps of the workflow to resolve the alarm or incident occurring at the building.

2. The computing device of claim 1, wherein the user interface of the computing device is configured to receive a selection of the building navigation model in the operational user interface.

3. The computing device of claim 1, wherein the number of orthogonal navigation models further include an alarm navigation model for the building management system.

4. A method for navigating an operational user interface for a building management system, comprising:
- generating, by a computing device, an operational user interface for a building management system used to manage an alarm or incident occurring at a building, wherein the operational user interface includes a number of orthogonal navigation models for the building management system within a single navigation structure that can be used to manage the alarm or incident occurring at the building, the number of orthogonal navigation models including:
  - a building navigation model for the building management system including a floor plan of at least part of the building; and
  - an incident or alarm navigation model for the building management system including information regarding each of one or more incidents or alarms and a workflow that includes a plurality of steps for resolving the corresponding incident or alarm, and wherein the building management system identifies a location for each of at least some of the one or more incidents or alarms on the floor plan;
- displaying the operational user interface on the user interface of the computing device;
- displaying, within the single navigation structure in the operational user interface, information from the building navigation model including at least part of the floorplan and, responsive to a selection of one of the one or more incidents or alarms, concurrently displaying information from the incident or alarm navigation model regarding the selected incident or alarm including the corresponding workflow for resolving the selected incident or alarm, where the display of the floor plan in the operational user interface moves to display the location in the floor plan that correspond to the selected incident or alarm; and
- taking the plurality of steps of the workflow to resolve the incident or alarm occurring at the building.

5. The method of claim 4, wherein the method includes generating the operational user interface for the building management system using ontology data associated with the building management system.

6. The method of claim 5, wherein the method includes generating the ontology data using building information modeling data associated with the building management system.

7. A non-transitory computer readable medium having computer readable instructions stored thereon that are executable by a processor to:
- display, on a user interface of a computing device, an operational user interface for a building management system used to manage an alarm or incident occurring at a building, wherein the operational user interface includes a number of orthogonal navigation models for the building management system within a single navigation structure that can be used to manage the alarm or incident occurring at the building, the number of orthogonal navigation models include:
  - a building navigation model for the building management system including a floor plan of at least part of the building; and
  - an incident or alarm navigation model for the building management system including information regarding each of one or more incidents or alarms and a workflow that includes a plurality of steps for resolving the corresponding incident or alarm, and wherein the building management system identifies a location for each of at least some of the one or more incidents or alarms on the floor plan;
- display, within the single navigation structure in the operational user interface, information from the building navigation model including at least part of the floorplan and, responsive to a selection of one of the one or more incidents or alarms, concurrently display information from the incident or alarm navigation model regarding the selected incident or alarm including the corresponding workflow for resolving the selected incident or alarm, where the display of the floor plan in the operational user interface moves to display the location in the floor plan that correspond to the selected incident or alarm; and
- take the plurality of steps of the workflow to resolve the incident or alarm occurring at the building.

8. The computer readable medium of claim 7, wherein the floor plan includes a number of selectable icons, wherein each respective selectable icon represents a different security camera located on the level of the building.

9. The computer readable medium of claim 7, wherein the information regarding each of the one or more alarm or incident includes:
- the workflow;
- information about activities occurring during the alarm or incident; and
- information about the plurality of steps taken to manage the alarm or incident.

10. The computer readable medium of claim 7, wherein the instructions are executable by the processor to, responsive to a selection of a third one of the number of orthogonal navigation models in the operational user interface:
- display, within the single navigation structure in the operational user interface, information from another one of the number of orthogonal navigation models; and
- remove, from the display of the operational user interface, the information from one or more of the building navigation model and the incident or alarm navigation model.

* * * * *